United States Patent [19]

Shinbashi et al.

[11] Patent Number: 5,796,717
[45] Date of Patent: *Aug. 18, 1998

[54] SYSTEM FOR SWITCHING FROM WORKING UNITS TO STAND-BY UNITS

[75] Inventors: Masahiro Shinbashi, Kawasaki; Takashi Wakabayashi, Yokohama, both of Japan

[73] Assignee: Fujitsu Limited, Kawasaki, Japan

[*] Notice: The portion of the term of this patent subsequent to May 7, 2008, has been disclaimed.

[21] Appl. No.: 621,005

[22] Filed: Dec. 3, 1990

Related U.S. Application Data

[63] Continuation of Ser. No. 336,614, Apr. 6, 1989, Pat. No. 5,014,261, which is a continuation of Ser. No. 1,029, Jan. 7, 1987, abandoned.

[30] Foreign Application Priority Data

Jan. 7, 1986 [JP] Japan ................................ 61-000306

[51] Int. Cl.⁶ ............................................. H04J 1/16
[52] U.S. Cl. ................................... 370/216; 340/827

[58] Field of Search ................... 370/16, 16.1, 216, 370/217, 218, 219, 220, 221, 222, 223, 224, 225, 227, 228; 371/8, 8.1, 8.2; 340/825.01, 825.07, 827; 455/8, 7; 379/221; 395/180, 181

[56] References Cited

U.S. PATENT DOCUMENTS

4,597,079  6/1986  Aoki et al. ................................ 370/16
5,014,261  5/1991  Shinbashi et al. ....................... 370/16

Primary Examiner—Dang Ton
Attorney, Agent, or Firm—Staas & Halsey

[57] ABSTRACT

A switching system for switching from a unit or units in a working state to a unit or units in a stand-by state in which the units in a stand-by state are provided as either individual stand-by units or as common stand-by units. An individual stand-by unit or a switching unit can be accommodated at a position at which it forms a pair with a working unit, and a working unit or units which are to be connected to a switching unit upon the occurrence of failure of the working unit or units are automatically connected to a common stand-by unit.

8 Claims, 11 Drawing Sheets

CONNECTION FOR
INDIVIDUAL STAND-BY UNITS

Fig. 5

Fig. 8A  SWITCHING CIRCUIT  RELAY

Fig. 8B  SWITCHING CIRCUIT

Fig. 8C  SWITCHING CIRCUIT 5,796,717

1

SYSTEM FOR SWITCHING FROM WORKING UNITS TO STAND-BY UNITS

This is a continuation of U.S. patent application Serial No. 07/336,614 now Pat. No. 5,014,261, filed Apr. 6, 1989 which was a continuation of U.S. patent application, Ser. No. 07/001,029, filed Jan. 7, 1987, now abandoned.

BACKGROUND OF THE INVENTION

1. Field of the Invention

The present invention relates to a control system for switching between working units and stand-by units, and more particularly, to a system which can realize a change-over constitution between working units and stand-by units in response to the degree of importance of the working unit, especially in a digital multiplex equipment having a plurality of units for multiprocessing signals, such as multiplexing or demultiplexing operations.

2. Description of the Related Arts

In recent semiconductor technology, a large number of circuits are integrated to form, for example, a multiplexing portion or a demultiplexing portion in a multiplex network; these integrated circuits being mounted on a printed circuit board to form a unit. A plurality of these units are contained in one package, in accordance with the number of multiplexing lines in use, to form a multiplexer unit or a demultiplexer unit. Obviously, in such a unit-using structure, a stand-by unit must be provided to improve the reliability of the package, by switching from a working unit to a stand-by unit when a fault occurs in the working unit. In this description, the term "working unit" denotes a unit currently in operation.

In data communication, a multiplexer or a multiplexer unit is provided in which a plurality of data transmission lines are multiplexed to enable the forming of a faster data transmission line, and this multiplexer possesses both multiplexing and demultiplexing functions.

Figure 1:
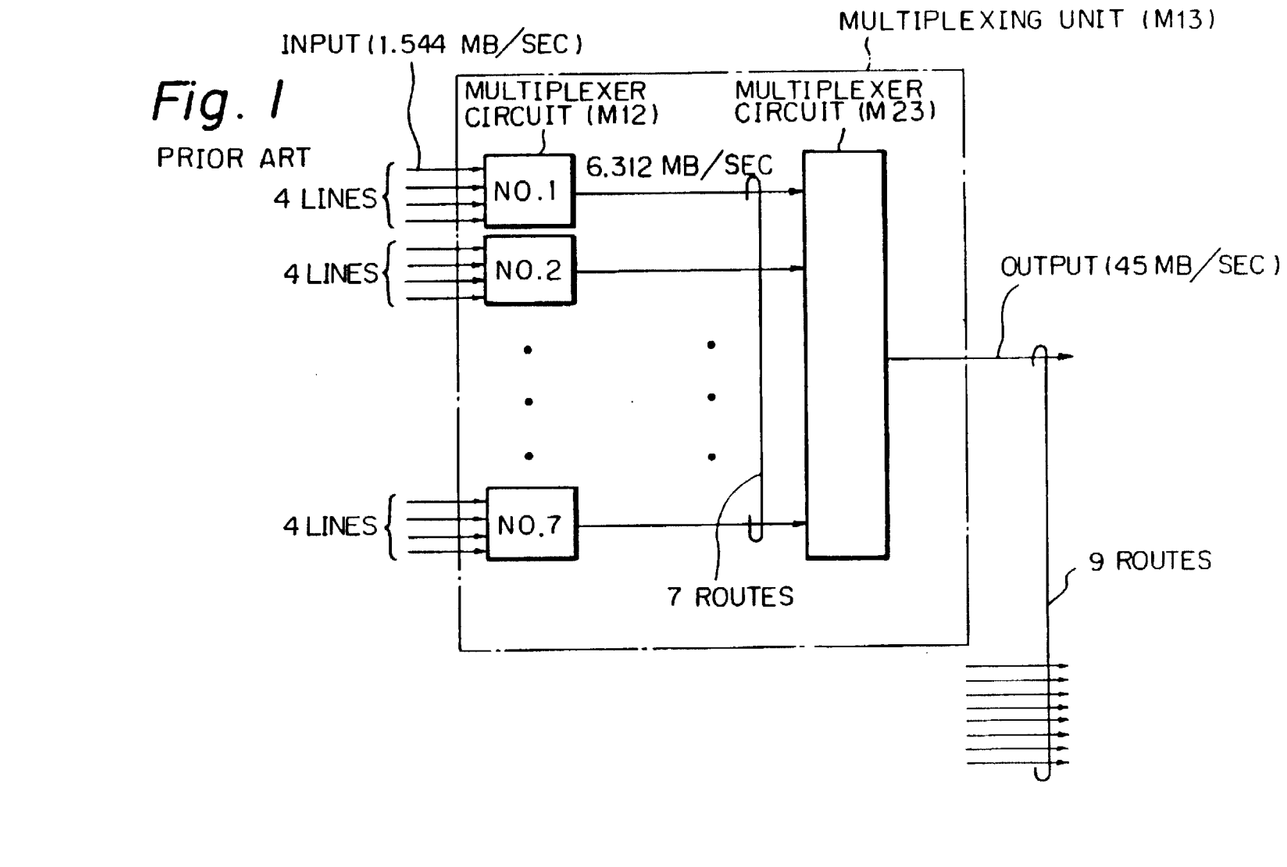
FIG. 1 is a functional diagram of a prior art multiplexer.

A multiplexer is conventionally used as shown in FIG. 1. For example, data of 1.544 MB/sec is transmitted via four lines to a first multiplexing circuit (e.g., M12), the output of which is multiplexed to transmit data of 6.312 MB/sec to a second multiplexing circuit (e.g., M23) via seven circuits. The seven first multiplexing circuits and the second multiplexing circuit form a multiplexer unit such as M13 MUX. Further, nine multiplexer units are combined therewith to form a third multiplexer unit. Then, twenty-eight lines of data are multiplexed by seven multiplexing circuits M23 to output data of 45 MB/sec, and further, via nine lines for data of 45 MB/sec, multiplexing is carried out via data transmission lines to output data (e.g. 405 MB/sec)

In general, the change-over operation or switching operation between working units and stand-by units is carried out as follows.

(1) 1-to-1 switching structure

This is a structure in which a stand-by unit is provided for one working unit.

(2) n-to-1 switching structure

This is a structure in which a stand-by unit is provided for n working units to form an n-to-1 switching structure.

The 1-to-1 switching structure is applied to a working unit having a relatively high importance, and the n-to-1 switching structure is applied to a working unit having a relatively low importance. A unit having a high importance is one utilized, in particular, for an administrative office, a fire department, military forces, and a police station or the like.

2

(3) n-to-m switching structure

This is a structure in which m stand-by units are provided for n working units. This structure has an unavoidable problem in that the switching structure between the working unit and the stand-by unit is very complicated.

In a prior art switching technique between the working units and the stand-by units, stand-by units are prepackaged in accordance with the degree of importance of the working units; i.e., the 1-to-1 or n-to-1 switching structure is formed. Therefore, the switching structure must be designed and manufactured to fit many kinds of systems. Moreover, even if the working unit has a low importance, more stand-by units than necessary must be packaged, and thus incurs a disadvantage of an uneconomical structure. On the contrary, when the importance of working units is high, each working unit must have a stand-by unit appended thereto.

Figure 2:
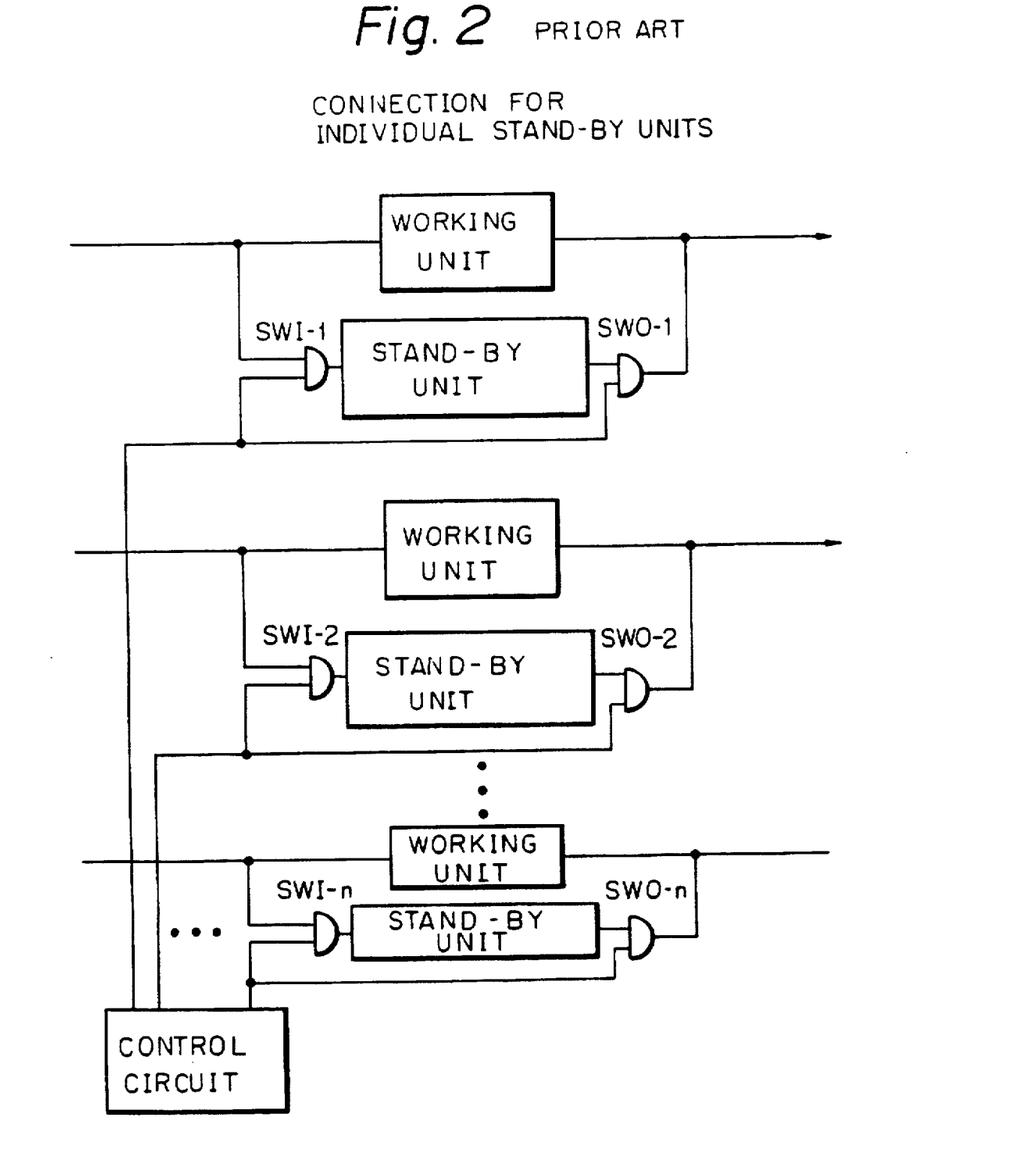
FIG. 2 shows the connections for individual stand-by units in the prior art.
Figure 3:
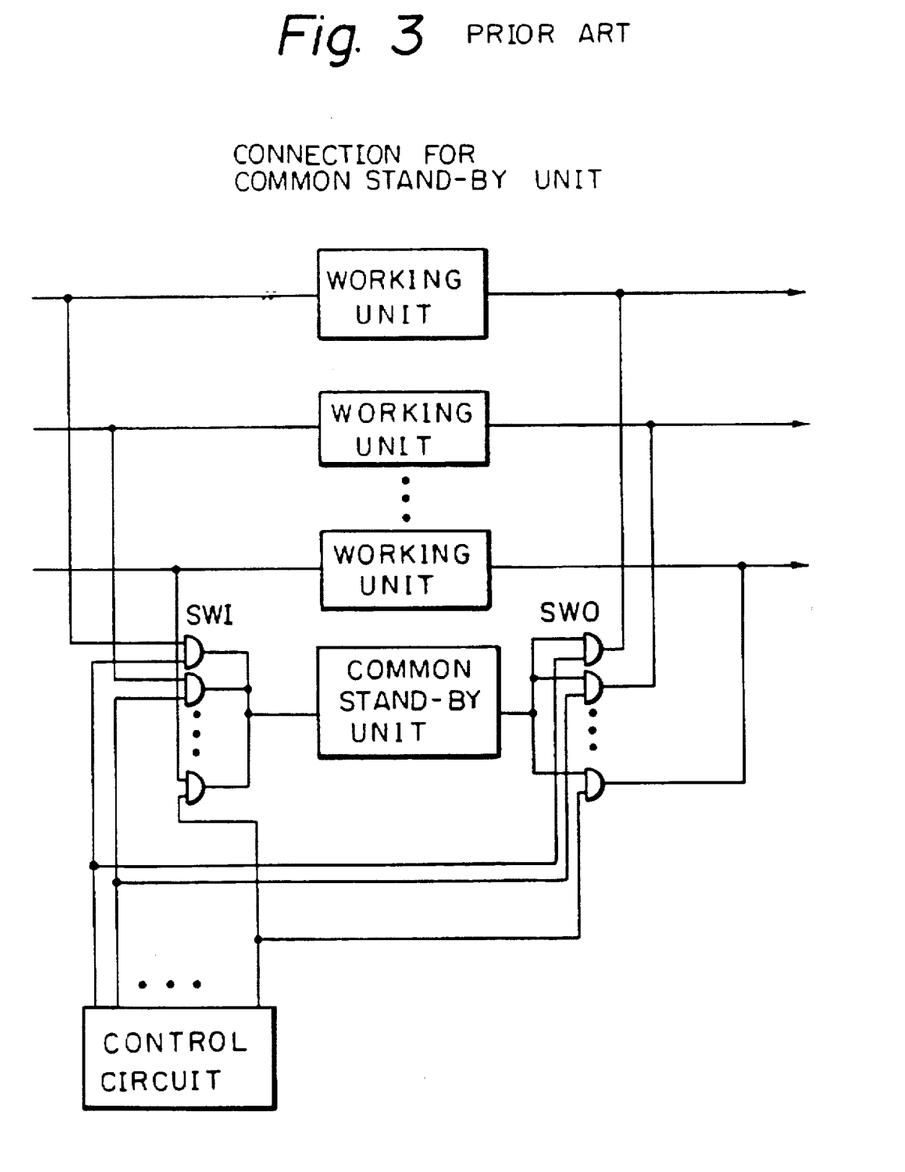
FIG. 3 shows the connections for a common stand-by unit in the prior art.

The connections for individual stand-by units and for a common stand-by unit in the prior art are illustrated in FIGS. 2 and 3.

In FIG. 2 the individual stand-by units are connected in parallel with or in accordance with a plurality of working units through input side switch elements SWI-1 to SWI-n and output side switch elements SWO-1 to SWO-n, and a control circuit is connected to all of the input side switch element and output side switch element.

In FIG. 3 a common stand-by unit is connected to a plurality of working units through a plurality of input side gates SWI-1 to SWI-n and a plurality of output side gates SWO-1 to SWO-n.

SUMMARY OF THE INVENTION

It is an object of the present invention to provide an improved switching system in which the switching from a working unit to an individual stand-by unit or to a common stand-by unit is carried out in correspondence with the degree of importance of the working unit.

In accordance with the present invention, there is provided a switching system for switching from a unit or units in a working state to a unit or units in a stand-by state in which the units in a stand-by state are provided as either individual stand-by units or as a common stand-by unit, an individual stand-by unit or a switching unit being able to be accommodated at a position in which said unit forms a pair with a working unit, and working unit or units which are connected to a switching unit upon occurrence of a failure of the working unit, or the units being automatically connected to a common stand-by unit.

Therefore, in accordance with the present invention, region in which the stand-by units are accommodated is provided in accordance with the working units, wherein the stand-by unit is provided for the working unit having a high degree of importance on a 1-to-1 basis, and a common stand-by unit is provided for the working unit having a low degree of importance. Subsequently, a switching unit which carries out a switching and connection operation with the common stand-by unit, is accommodated in the accommodation region of the stand-by unit for the work units.

BRIEF DESCRIPTION OF THE DRAWINGS

FIGS. 4A, 4B, and 4C are block diagrams showing embodiments of the present invention, wherein FIG. 4A is for the case of working units, individual stand-by units, and a common stand-by unit, FIG. 4B is for the case of working units and individual stand-by units, and FIG. 4C is for the case of working unit and a common stand-by unit;

DESCRIPTION OF THE PREFERRED EMBODIMENTS

An embodiment of the present invention will be described in detail with reference to the accompanying drawings.

Figure 4A:
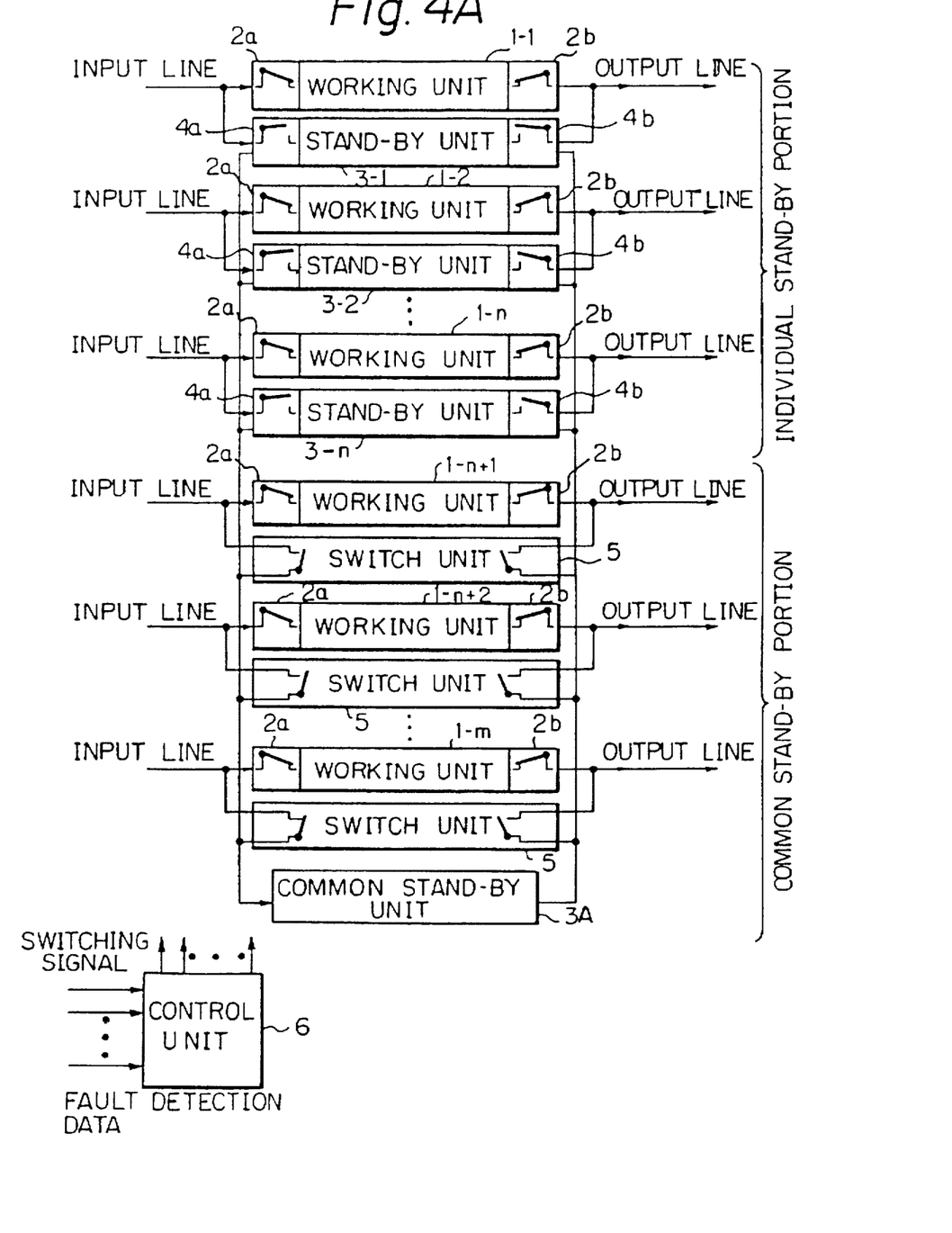

FIG. 4A is a block diagram showing an embodiment of the present invention.

The switching system as shown in FIG. 4A is provided with first, second and third portions or accommodation regions.

The first region accommodates m number of working units 1-1 to 1-m having an input side switching portion 2a and an output side switching portion 2b. Provided for the respective working units 1-1 to 1-n are n number of stand-by units 3-1 to 3-n having an input side switching portion 4a and an output side switching portion 4b.

The second region accommodates at least one common stand-by unit 3A. The working units 1-1 to 1-m, the stand-by units 3-1 to 3-n, and the common stand-by unit 3A have the same structure. When a multiplexer unit is formed, a plurality of input lines are connected through switching portions to the input side, and a plurality of output lines are connected through switching portions to the output side.

Assuming that the working unit 1-1 has a high degree of importance, then a stand-by unit 3-1 is provided for the working unit 1-1 and the switching portions 2a and 4a are connected to the input side, for example, to a plurality of input lines, while the switching portions 2b and 4b are connected to the output side, for example, to a multiplex transmission line. In this case the switching portions 2a, 2b, 4a, and 4b are provided with a switching structure corresponding to the structure of the input lines and the multiplex line.

A switching unit 5 composed of only a switching portion is provided for each of the working units 1-n+1 to 1-m. The input lines for each working unit 1-n+1 to 1-m are connected through a switching portion of the switching unit 5 to the input side of the common stand-by unit 3A, and a multiplex line for each working unit 1-n+1 to 1-m is connected through a switching portion of the corresponding switching unit 5 to the output side of the common stand-by unit 3A. In this case, the switching portion of the corresponding switching unit 5 is comparable to the switching portions 4a, and 4b of the stand-by units 3-1 to 3-n.

A control unit 6 receives fault detection data from the working units 1-1 to 1-m and the corresponding stand-by units, and outputs switching signals for controlling the switching portions 2a, 2b,4a, 4b and the switching portion of the switching units 5.

Since the stand-by unit 3-1 is provided for the working unit 1-1, the working unit 1-1 has a 1-to-1 structure for working unit-stand-by unit switching and when a fault occurs in the working unit 1-1, connection of the input lines and a multiplex line for working unit 1-1is switched to the stand-by unit 3-1. Connection of the working units 1-n+1 to 1-m is switched through the corresponding switching unit 5 to the common stand-by unit 3A. Therefore, if m−n=k, a k-to-1 working unit stand-by unit switching structure can be realized. Thus, when a fault occurs in any one of the working units 1-n+1 to 1-m,connection of an input line and a multiplex line of the working unit in which a fault has occurred are switched to the common stand-by unit 3A by the switching unit 5 corresponding thereto.

The individual stand-by portion of this embodiment shows a case of an individual stand-by portion having a high degree of importance wherein the stand-by units 3-1 to 3-n are accommodated for the working units 1-1 to 1-n and all of the working units 1-1 to 1-n are formed by a 1-to-1 working unit and stand-by unit switching structure. Therefore, the common stand-by unit 3A (as shown in FIG. 4C) is unnecessary. Similarly, there may be a case where all of the working units are in the common stand-by portion in FIG. 4A. In this case the working units 1-n+1 to 1-m and the common stand-by unit 3A will form a k-to-1 switching structure between the working units and the stand-by unit where k=m−n.

Figure 4B:
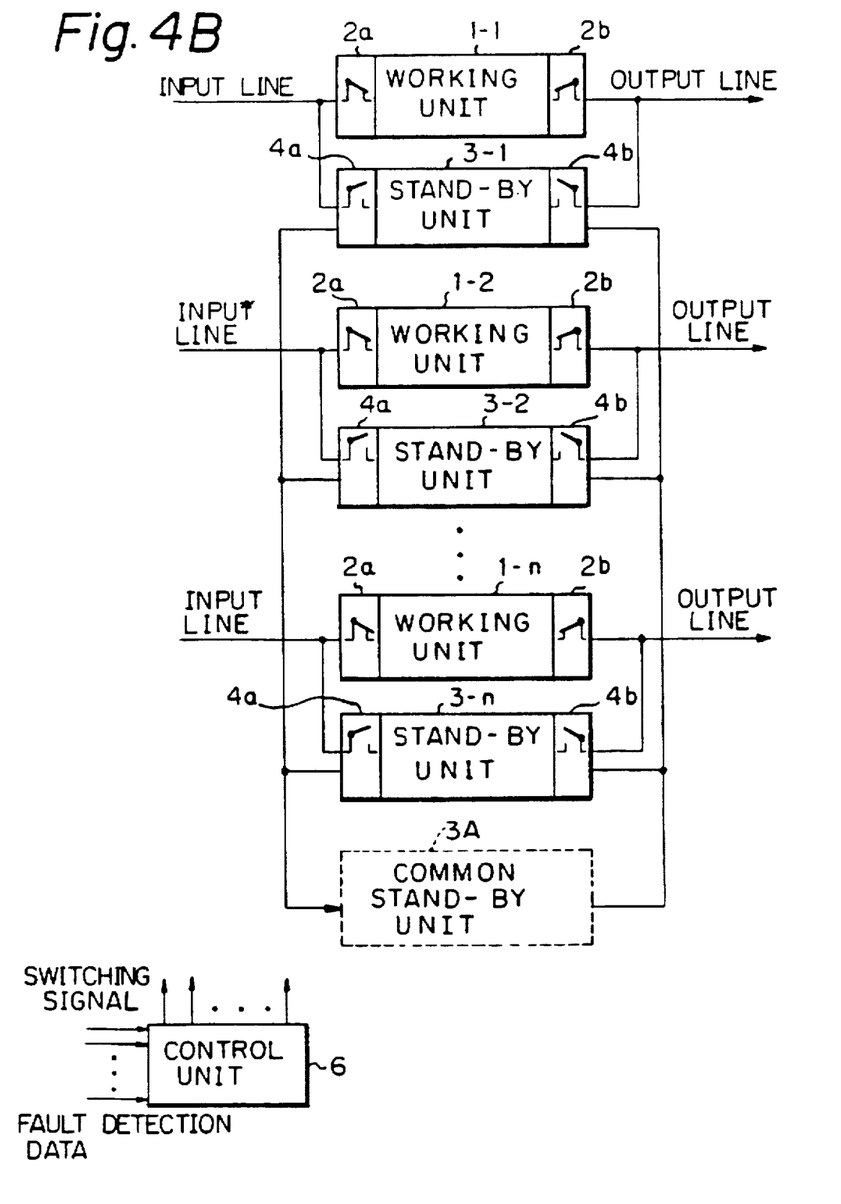
Figure 4C:
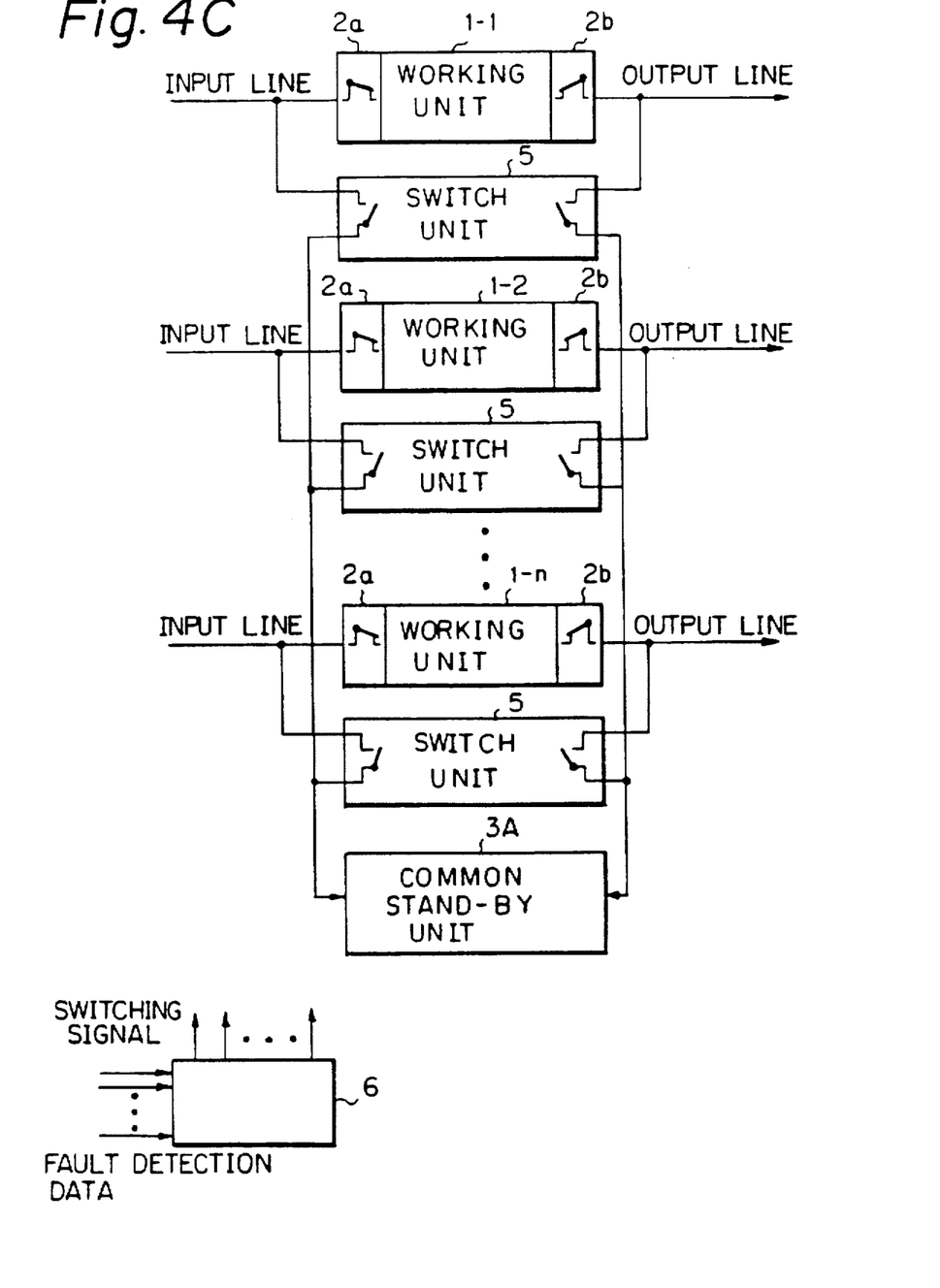

FIG. 4B is a block diagram showing a second embodiment of the present invention. In FIG. 4B, the stand-by units 3-1 to 3-n which make a pair with the respective working units are accommodated responsive to the working units 1-1 to 1-n, so all of the working units 1-1 to 1-m have a 1-to-1 working unit versus stand-by unit switching structure. Therefore, the space for the common stand-by unit 3A which is illustrated by broken lines is not accommodated therewith.

Pairs, of working units 1-1 to 1-n are connected to corresponding and stand-by units 3-1 to 3-n on in the input sides and output sides. The stand-by units 3-1 to 3-n and common stand-by unit 3A are connected commonly on the input sides and output sides. Of course, a control unit 6 is provided.

FIG. 4C is a block diagram showing a third embodiment of the present invention. In FIG. 4C, the corresponding switching units 5 are provided in the accommodation region of the stand-by units responsive to the working units 1-1 to 1-n and further a common stand-by unit 3A is provided therewith, so a n-to-1 working unit versus stand-by unit switching structure is formed. The switching units 5 which occupy n locations corresponding to the working units 1-1 to 1-n and a common stand-by unit 3A are connected on the input side and the output side to each other. The working units 1-1 to 1-n are connected to corresponding switching units 5 on the input side and the output side.

Furthermore, m of regions for accommodating the common stand-by unit 3A may be provided, and the working units 1-1 to 1-n may be divided into m plurality groups and a common stand-by unit 3A may be accommodated for each group to form an n-to-m switching structure between the working units and the stand-by units.

The foregoing described embodiments relate to multiplexer equipment, but can be also applied to demultiplexer equipment.

As can be understood from the above description, a switching system for switching from a unit or units in a working state to a unit or units in a stand-by state is provided as,-either individual stand-by units or as a common stand-by unit, and an individual stand-by unit or a switching unit can be accommodated so that it forms a pair with a working unit and working unit or units which are connected to a switching unit, so that when a failure of the working unit or units occurs, the unit or units are automatically connected to a common stand-by unit.

Further it can be seen that the working unit consists of a plurality of working units, and the switching to an individual stand-by unit and the switching to a common stand-by unit can be selected according to need.

Moreover, each of the working units and stand-by units is a multiplexing or demultiplexing operation unit able to carry out a multiplexing operation for a plurality of data received through an input line to output multiplexed data to an output line.

Regarding the switching system in accordance with the present invention, it is understood that a switching from working units to stand-by units can be carried out only by a working/stand-by control, regardless of the individual stand-by connection or common stand-by connection.

More particularly, the switching system for switching from a unit or units in a working state to a unit or units in a stand-by state, in which the units in a stand-by state are provided as either individual stand-by units or as a common stand-by unit, each of the working units having a higher importance being provided with an individual stand-by units and each of working units having a lesser importance being provided with a switching unit, a plurality of the working units having a lesser importance being provided with a common stand-by unit, and a control unit being provided for controlling the switching from working units to stand-by units based on failure detection signals, whereby switching control signals from the control unit are supplied to the individual stand-by units or the switching units, and to the common stand-by units so that the switching from working units to the individual stand-by units or the common stand-by unit is carried out.

In the case of demultiplexer equipment, a multiplex line is connected to the input side and a plurality of transmission lines are connected to the output side. This may be also applied to repeater equipment or the like, and in that case, one transmission line is connected to both the input side and the output side.

Figure 5:
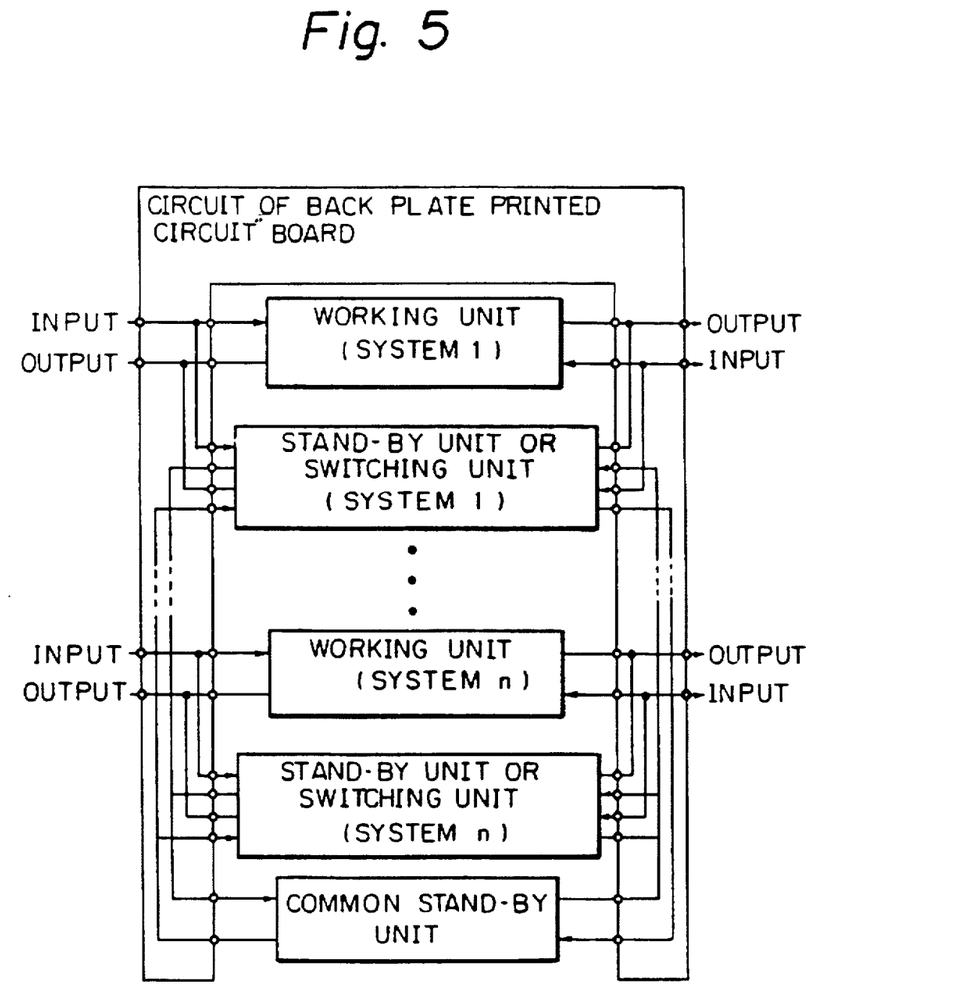
FIG. 5 is a wiring diagram showing an arrangement of working units and stand-by units relating to a back plate printed circuit board.

FIG. 5 illustrates a wiring diagram of a back plate printed circuit board, and shows a connection diagram of a system No. 1 to a system No. n; the relationship between working units, stand-by units, and a common stand-by unit is the same as in FIG. 4.

In the system according to the present invention, it is possible to adopt a shelf structure in which each stage of shelf plates are arranged perpendicular to the back plates and side walls at both sides. A number of units or unit plates are guided on rail means of the shelf plates and stopped by the back plates. A plurality of unit plates are inserted via guide means between supporting connectors and mounted vertically on the back board by means of a pair of connectors for supporting the unit plates.

Figure 6:
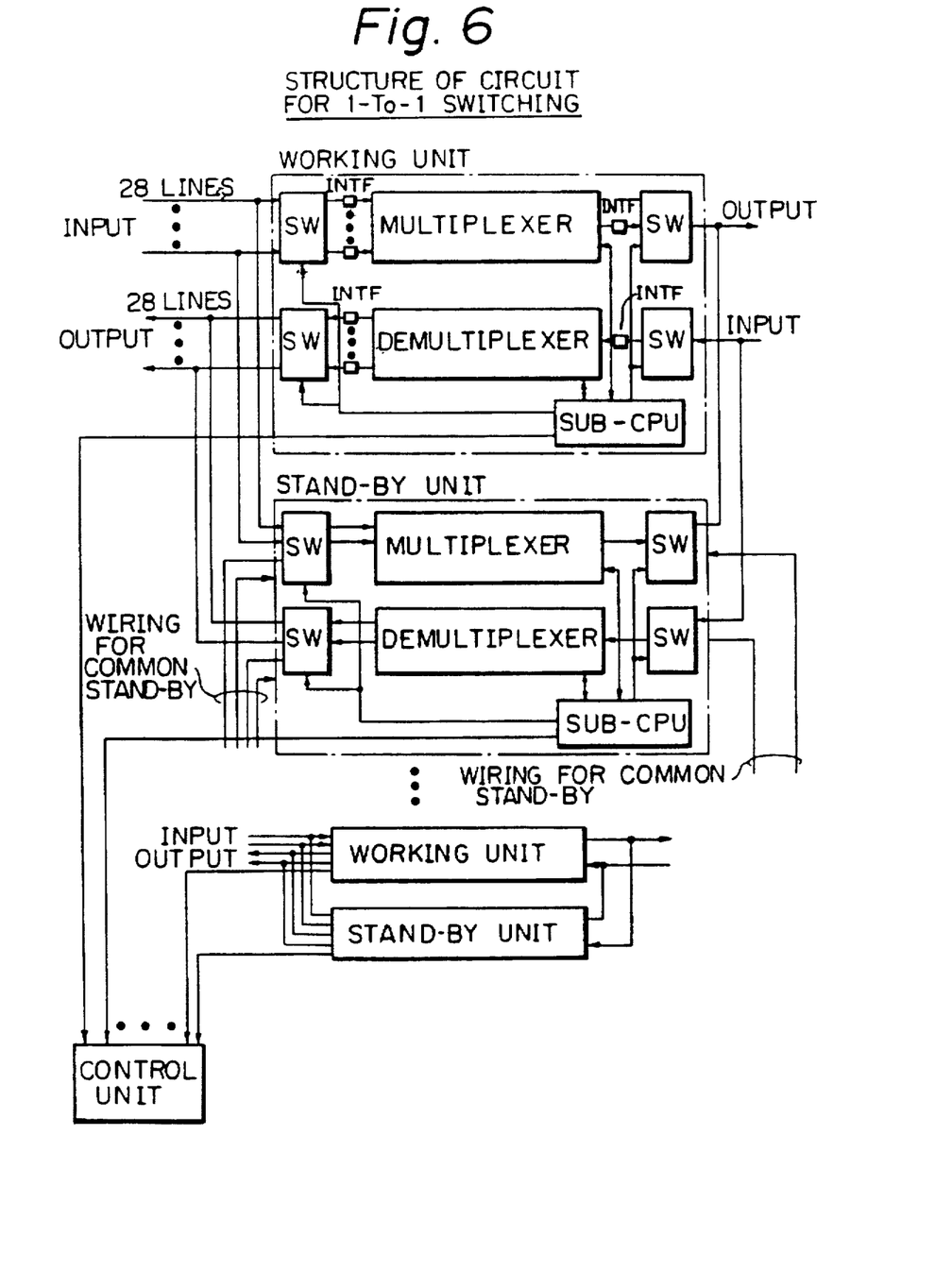
FIG. 6 shows a structure of a circuit for 1-to-1 switching.

FIG. 6 is a block diagram showing a 1-to-1 switching control system as an embodiment in accordance with the present invention. Each working unit has a corresponding stand-by unit connected in parallel therewith. The control unit controls the eight switch circuits connecting the multiplexers and demultiplexers in each pair of working and stand-by units, so that only one unit in each pair is active at any time. As illustrated, the wiring for the common stand-by unit is provided, but no common stand-by unit is installed, or is not activated by the control unit in the embodiment illustrated in FIG. 6.

Figure 7:
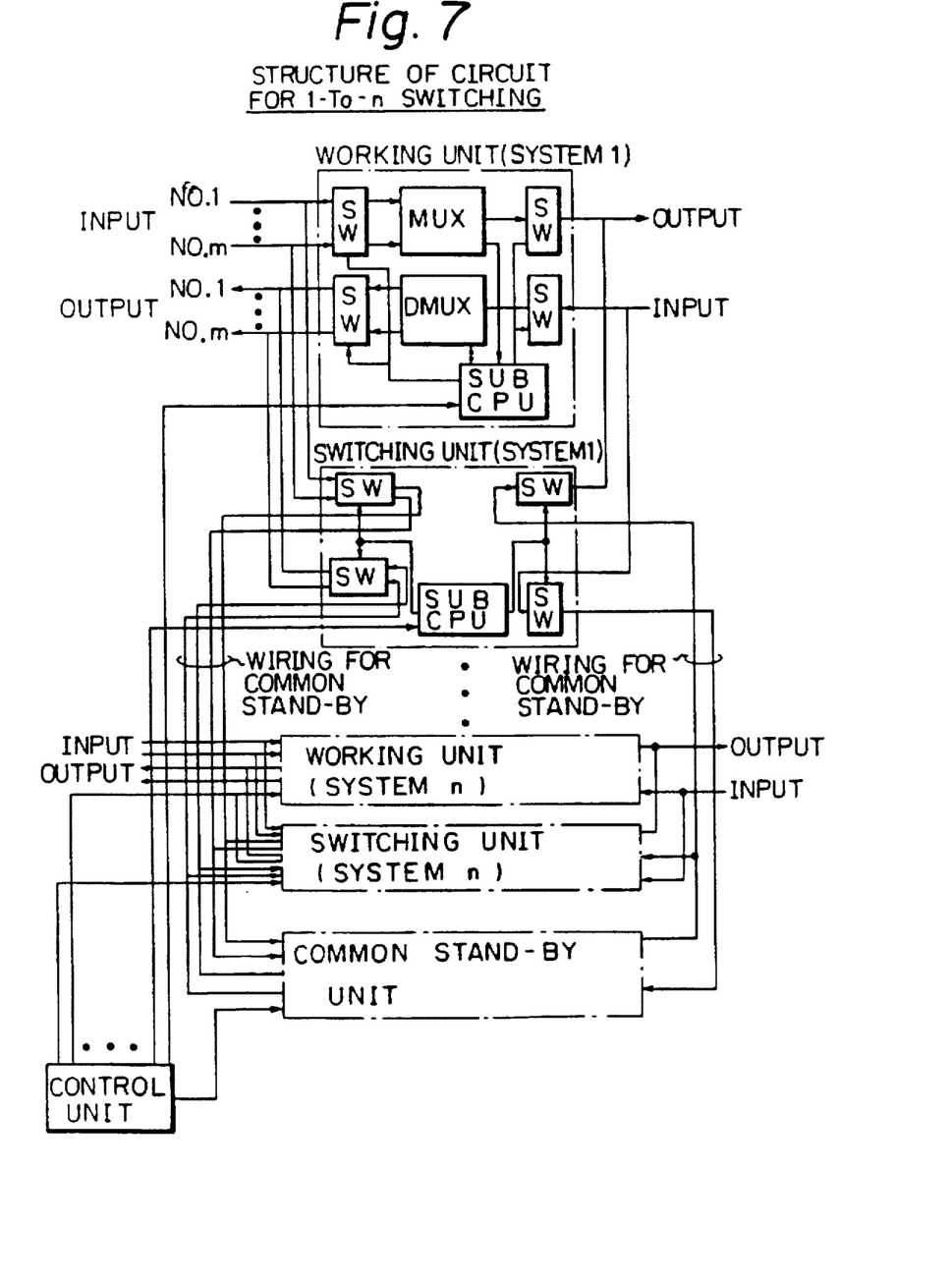
FIG. 7 shows a structure of a circuit for 1-to-n switching structure.

FIG. 7 is a block diagram showing a 1-to-n switching control system as an embodiment in accordance with the present invention. When a switching unit is installed corresponding to each of the working units as illustrated in FIG. 7, the switch circuits in the switching unit are controlled by the control unit to provide connections to the common stand-by unit via the wiring for the common stand-by unit. The wiring may be the same as in FIG. 6, although FIG. 7 has been simplified as showing only a single control line from the control unit to each switching unit and control within the switching unit by a SUB CPU.

Figure 8A:
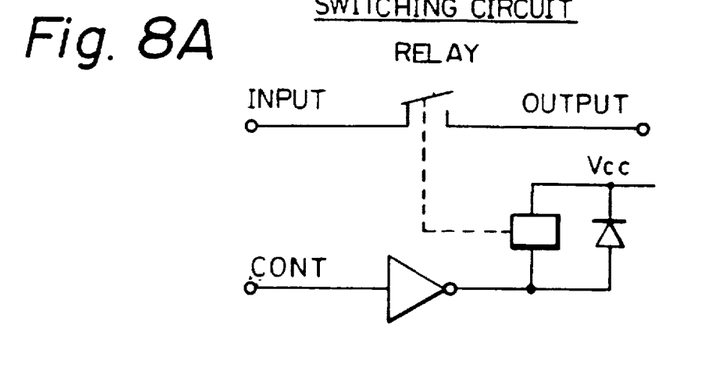
FIGS. 8A, 8B and 8C show examples of the switch circuit.
Figure 8B:
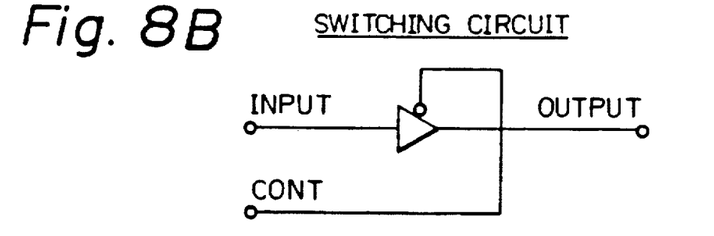
Figure 8C:
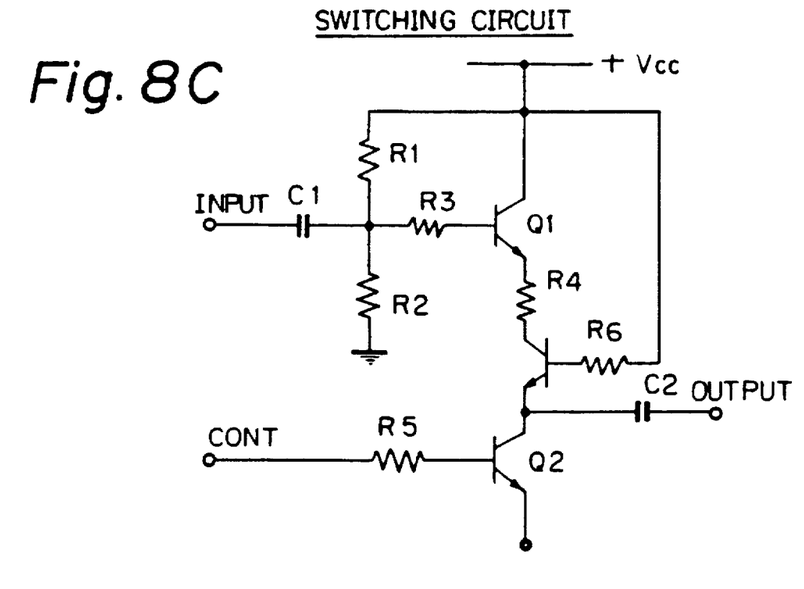

FIG. 8A is a block diagram of a high speed switch element, FIG. 8B is a block diagram of a low speed output switch employing a tri-state integrated circuit, and FIG. 8C is an example of a switch circuit as illustrated in FIGS. 6 and 7. Figs. 8A and 8B are functional block diagrams, while FIG. 8C is a detailed circuit diagram showing how the control signals from the control unit or the SUB CPU can be used to control the switches in the corresponding stand-by unit or switching unit.

Figure 9:
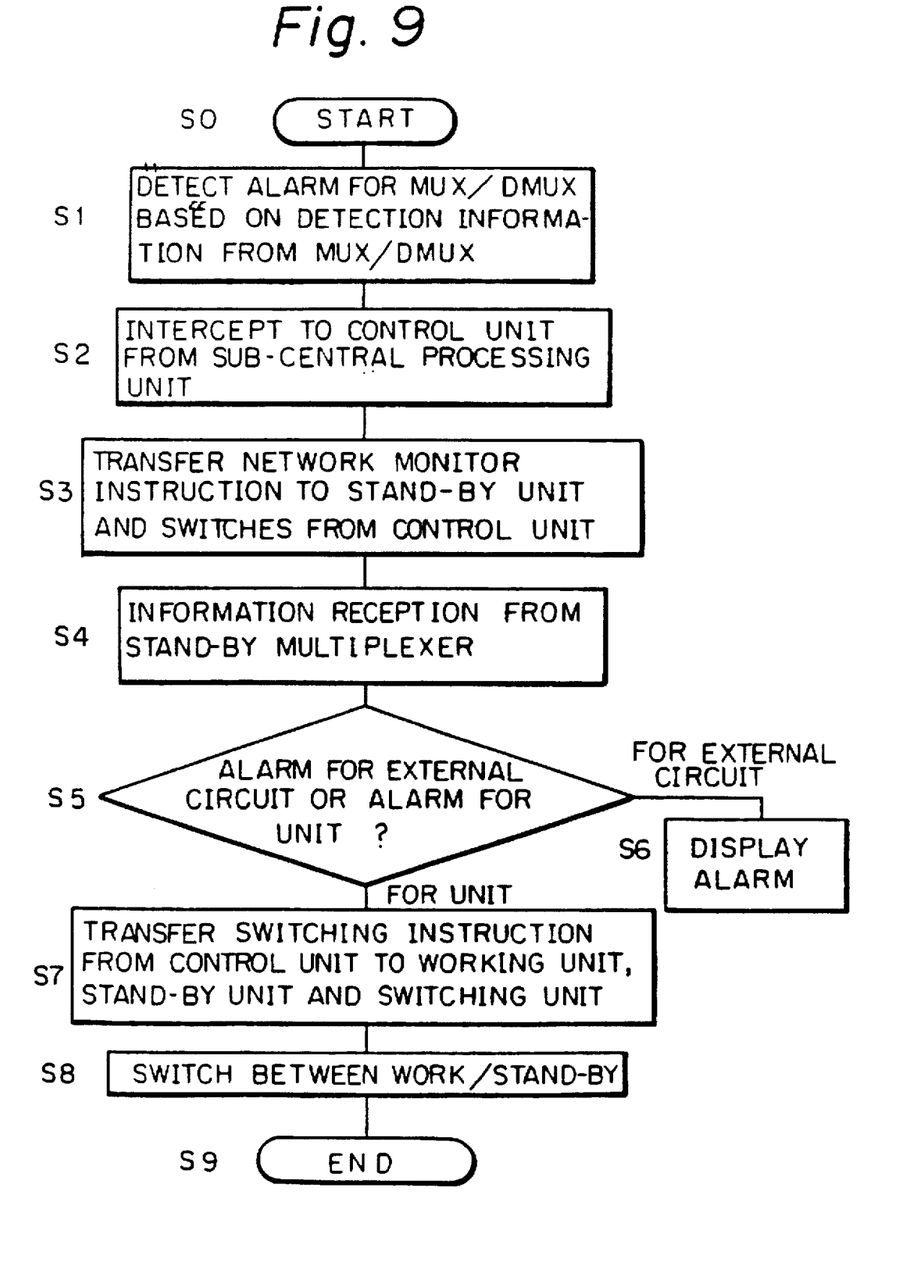
FIG. 9 is a flow chart of an example of the operation of the system according to the present invention.

FIG. 9 is a flow chart showing the operation of the switching system. After the alarm detection of a multiplexer or demultiplexer unit, a transmission line monitoring instruction is sent to the stand-by unit and switch from a control unit, and a determination of whether it is an external emergency or an internal emergency is carried out. In the case of a line alarm, a line alarm is displayed, and in the case of a unit alarm, a switching instruction is sent to the working unit and the stand-by unit from the control unit to realize a switching operation.

We claim:

1. A switching system for data operation units, able to switch input and output lines from working units to individual stand-by units and a common stand-by unit, comprising:

an-electrical wiring arrangement for providing connections from the input and output lines to a plurality of first locations, each provided for one of the working units, and a plurality of second locations, each provided for one of an individual stand-by unit and a switching unit, said electrical wiring arrangement providing electrical connections in parallel to pairs of the first and second locations and between all of the second locations and a third location provided for the common stand-by unit, the switching unit, when mounted at one of the second locations, providing switchable connection between the input and output lines for a corresponding working unit and the common stand-by unit in response to a signal.

2. A switching system according to claim 1, wherein the working unit and the individual and common stand-by units perform multiplex processing on input data on a plurality of the input lines, to transfer multiplexed data to the output line.

3. A switching system according to claim 1, wherein when a first working unit is handling data having a high degree of importance, one of the individual stand-by units is provided at a corresponding second location connected to the first working unit.

4. A switching system for connecting an input/output line to one of a working unit at a first location and a stand-by unit, comprising:

first connection means, for switchably connecting the input/output line to the first location and a second location different from the first location;

second connection means, for switchably connecting the second location to a third location different from the first and second locations; and control means for monitoring the working unit to detect a fault therein and for switching the input/output line, from the working unit at the first location to the second location, thereby connecting the input/output line to the stand-by unit when the stand-by unit is disposed at the second location and connecting the input/output line to a common stand-by unit when a switching unit is disposed at the second location.

5. A switching system according to claim 4, wherein the switching unit connects the input/output line, connected to the second location by said first connection means, to the third location, in response to detection of the fault by said control means.

6. A switching system according to claim 5, wherein the common stand-by unit comprises a switching circuit for connecting thereto the input/output line in response to detection of the fault by said control means.

7. A switching system according to claim 4, wherein the stand-by unit comprises a switching circuit for connecting thereto the input/output line in response to detection of the fault by said control means.

8. A switching system according to claim 4, wherein the working unit comprises a switching circuit for disconnecting therefrom the input/output line in response to detection of the fault by said control means.

* * * * *

UNITED STATES PATENT AND TRADEMARK OFFICE
CERTIFICATE OF CORRECTION

PATENT NO. : 5,796,717
DATED : August 18, 1998
INVENTOR(S) : Masahiro SHINBASHI et al.

It is certified that error appears in the above-identified patent and that said Letters Patent is hereby corrected as shown below:

Col. 3, line 53, after "the" (first occurrence) insert --corresponding--.

Col. 4, line 3, delete "a";
line 35, delete "in";
line 53, delete "of";
line 54, delete "plurality".

Signed and Sealed this

Twenty-third Day of February, 1999

Attest:

Q. TODD DICKINSON

*Attesting Officer*     *Acting Commissioner of Patents and Trademarks*